A. P. JURGENSEN.
OPTICAL APPARATUS.
APPLICATION FILED DEC. 30, 1912.
1,273,068.
Patented July 16, 1918.
2 SHEETS—SHEET 1.
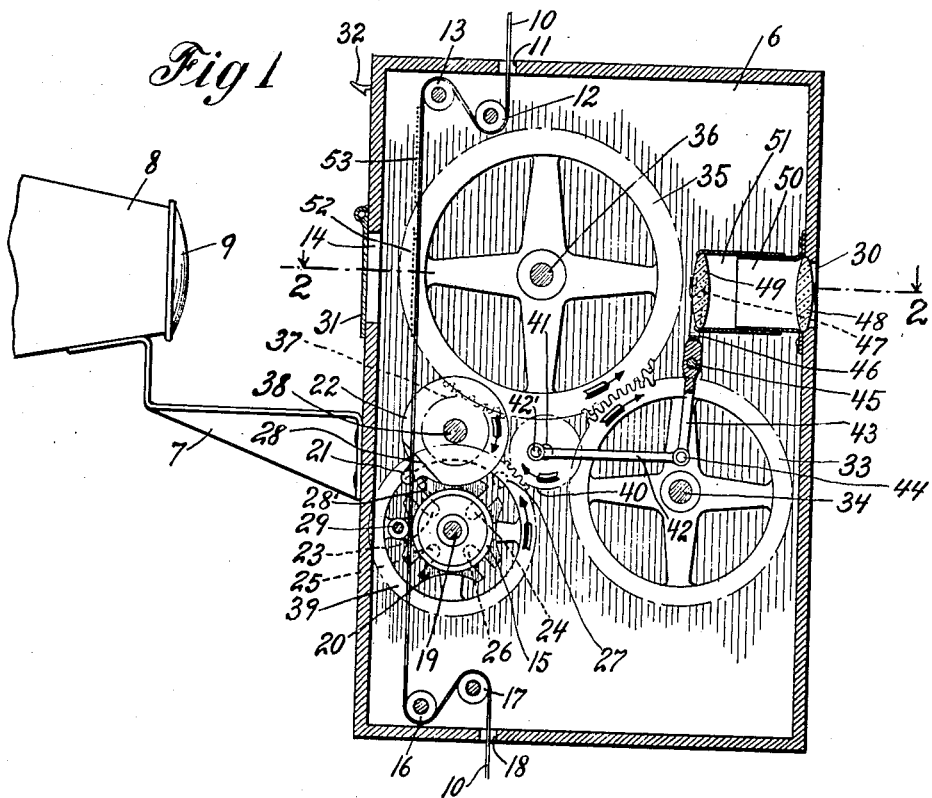
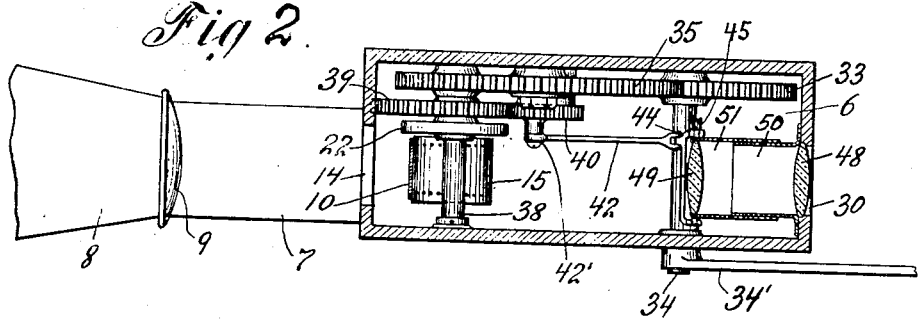

A. P. JURGENSEN.
OPTICAL APPARATUS.
APPLICATION FILED DEC. 30, 1912.
1,273,068.
Patented July 16, 1918.
2 SHEETS—SHEET 2.
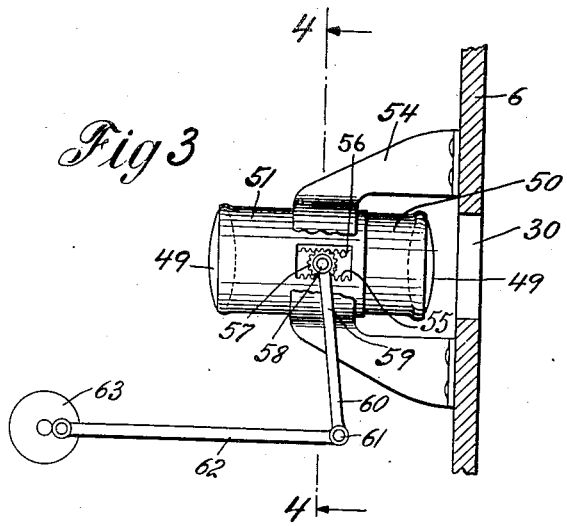
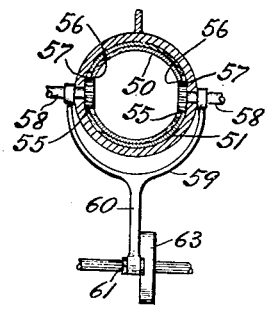
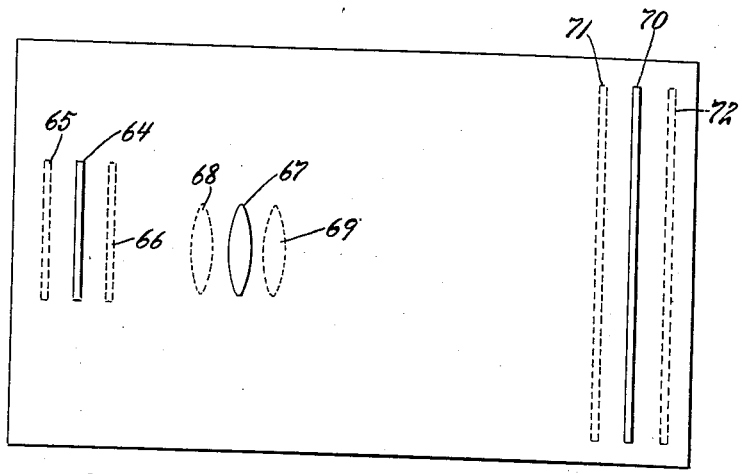

UNITED STATES PATENT OFFICE.

AUGUST P. JURGENSEN, OF NEW YORK, N. Y., ASSIGNOR TO EUREKA PROJECTOR DEVICE CO., INC., OF NEW YORK, N. Y., A CORPORATION OF NEW YORK.

OPTICAL APPARATUS.

1,273,068.     Specification of Letters Patent.     Patented July 16, 1918.

Application filed December 30, 1912. Serial No. 739,294.

*To all whom it may concern:*

Be it known that I, AUGUST P. JURGENSEN, a subject of the King of Denmark, and resident of New York, in the county of New York and State of New York, (whose post-office address is 170 Broadway, New York, N. Y.,) have invented certain new and useful Improvements in Optical Apparatus, of which the following is a specification.

This invention aims to provide improved optical apparatus, and more particularly an improved moving picture machine, which shall permit the throwing of the successive impressions or pictures upon a screen without disclosing the transition from one impression to the next, and which shall thus to a great degree, first attain the effect of neutralizing or entirely removing the disagreeable flickering, so injurious to the eye-sight, which obtains when the rapid, intermittent projections of successive views are thrown upon a screen; and, second, avoid the unsatisfactory and disillusionizing effect of exaggerated rapidity which has existed heretofore. By the invention herein disclosed the objectionably rapid flashes of light which have heretofore taken place will be entirely avoided.

The invention is shown as applied to the usual type of film moved in the ordinary way, that is to say, exposed in a fixed position for a certain length of time, whereby a representation carried thereon will be effective for projection, and then quickly shifted to the next fixed position, whereon another representation carried thereon will displace said first representation. In existing apparatus, in order to avoid the making of a noticeable break during the transition from one impression to the next, the successive transitions must be effected very rapidly. The period of transition, although very short, is usually of considerable extent compared with the period of display of each impression. Moreover, in order to avoid the observance of the actual operation of the displacement of one picture in a series by its successor, it has been found essential to interpose a shutter or the like adapted to completely blot out the light for this short period of transition, thus occulting the illumination for two very brief intervals and admitting the illumination upon the screen for one very brief interval in all its intensity, these three intervals arising during a single stationary period of the intermittently fed film. In this connection, various forms of shutter have been heretofore provided, all aiming to minimize this injurious artificial flickering and have been generally characterized by various degrees of complexity and generally unsatisfactory results.

It should be stated at the outset that this invention contemplates any mechanism or means having for its object the utilization of optical apparatus employing a plurality of optical interponents whereby the operation of such apparatus, in accordance with the well known and demonstrated theory of the persistency of vision or otherwise, will be accomplished in the absence of the employment of an auxiliary adjustable interponent and more particularly wherein there may be dispensed with the usual shutter, so called "dimmer" or interposed occulting means of any type. And in order to illustratively indicate a possible application of my invention in accordance with the foregoing, but with no intention of delimiting its scope as laid down above, there are disclosed herein certain embodiments of this invention designed to come within the aforesaid scope of my invention by virtue of employing means adapted to destroy the focal relations normally existing between the lighting means, the lens system, and the screen, simultaneously with the changing of the picture.

The foregoing indicates the main objects of this invention, but various other aims and contemplations will appear hereinafter.

The relations of the means and functions in the illustrative apparatus hereinafter immediately to be described, and such apparatus themselves, are, however, not of the essence of this invention; the scope of the application of which will be indicated in the appended claims.

Referring now to the accompanying drawings in certain views of which are disclosed a plurality of embodiments of this invention, in all of which the above-mentioned variation of the above-described focal accord is illustratively shown as being effectuated by means of normal and abnormal dispositions of the lens means disclosed, Figure 1 is a vertical sectional view taken through the portion of a projecting machine which is usually denominated the "head";

Fig. 2 is a horizontal sectional view taken on the line 2—2 of Fig. 1 and looking in the direction of the arrows, showing unbisected the gear 35;

Fig. 3 is a detail view, partly diagrammatic, in side elevation and partly broken away, illustrating another embodiment of this invention in accordance with the above-referred to plan of illustrative disclosure;

Fig. 4 is a sectional view of the parts shown in Fig. 3 taken on the line 4—4 of said figure and looking in the direction of the arrows; and Fig. 5 is a diagrammatic view showing broadly possible factors capable of utilization in constructing an embodiment of this invention in accordance with the aforesaid statement of an illustrative subdivision of its scope.

Similar reference characters refer to similar parts throughout the several views of the drawings.

Referring now to the specific embodiment of this invention shown in Figs. 1 and 2 of the accompanying drawings, 6 represents a casing for the head-mechanism, carrying exteriorly a bracket 7, bracket 7 in turn supporting the cone 8 and the lens 9; all of which, or the equivalents thereof, are well known in the art. A film 10 of the usual type is shown as traversing the interior of said casing, passing through the aperture 11, thence under the idler 12 and over the idler 13, thence descending whereby a portion of it will traverse opposite the window 14, thence still descending so that the customary edge-adjacent perforations formed therein will enter, oppositely of the idler 29, into mesh with the teeth shown as carried upon the usual sprocket wheel 15, thence under the idler 16 and over the idler 17 to make exit from the casing through the aperture 18. The sprocket wheel 15 is mounted upon the shaft 19 for rotation thereon and is here shown as being controlled by a Geneva movement of the usual type, the sprocket wheel 15 being fixedly attached to the star wheel 20 so that upon each actuation of the star wheel by the usual co-action therewith of the stud 21 carried on the driving wheel 22, thereby once during each revolution of said driving wheel causing for a fractional part of such revolution a quarter revolution of said star wheel.

Star wheel 20 is provided with four radial slots as shown, numbered respectively 23, 24, 25 and 26, and is also provided with the peripheral concavities between the slots to present arcs conformed to the circumferential periphery of the driving wheel 22. This driving wheel is provided with the stud 21, projecting as shown from a point beyond its periphery. Attention in passing is directed to the position illustrated in dotted lines at 27, which will be hereinafter referred to in connection with the description of the operation of this embodiment.

Driving wheel 22 is also provided with a cutaway portion 28, which defines the commencement of a lip 29 adapted directly to support stud 21.

In alinement with lens 9 and window 14 is a window 30, adapted to have supported adjacent thereto a focusable lens-means of the usual type which will below be described. Window 14 is shown as being provided with the usual door 31, which may be opened when desired and thereafter snapped into ineffective position under the usual latch 32, thereby to afford an uninterrupted path, through an interposed representation upon film 10, for the usual ray-pencil.

A simple gear-train is here shown within casing 6, arranged in such a manner that an integral system is provided for drive, by means of the gear wheel 33 mounted upon the shaft 34, thereby to attain properly predetermined synchronism in the cyclic operations of the salient instrumentalities, shaft 34 being adapted to carry an operating crank (see here Fig. 2 at 34'), driving pulley or the like.

Adverting to this disclosed integral system, the simplicity and essential characteristics of which are deemed to be desirable, although the utilization thereof here not being necessarily indicative of preferment, gear-wheel 33 is arranged in mesh with the large gear-wheel 35 carried upon the shaft 36, and gear-wheel 35 is arranged in mesh with pinion 37, the latter being mounted upon shaft 38 and carrying with it the above-described driving wheel 22. Star wheel 20 and sprocket wheel 15, connected for simultaneous revolution upon shaft 19, carry with them, connected also for simultaneous revolution, the gear-wheel 39. Gear-wheel 39 is arranged in mesh with the pinion 40 carried on the shaft 41.

Pinion 40 carries, mounted eccentrically thereon upon pin 42', a link 42 connected to the lever 43 as at 44. Lever 43, as shown here, is a lever of the first class having a central pivot as at 45; and is provided with a yoke 46 adapted for pivotal connection as at 47 with a reciprocable portion of the lens-means above referred to and next to be described.

The lens-means here provided is shown as including a pair of lens-elements 48 and 49. Lens-element 48 is supported as shown adjacent the window 30 by the tube 50 mounted within casing 6. Lens-element 49 is fixedly mounted as shown within the tube 51. Tube 51 is capaciated for reciprocation relatively of the tube 50, and thereby for variation of the location of lens-element 48 with relation to lens-element 49, in such a manner that upon the reciprocation of tube 51 to a predetermined extent upon tube 50, the resultant relation of the lens-elements will set up in the presence of the other optical factors a focal accord capacitated for destruction upon a variation of the predetermined extent of reciprocation.

Having thus described this embodiment of the invention, the operation thereof may now be understood. Let us assume that a representation carried on the film 10 is disposed as diagrammatically indicated in dotted lines at 52, i. e., opposite the window 14 (the door 31 having obviously been swung clear and the source of illumination being utilized having been properly disposed to discharge its rays through the interior of the casing 6), and that a successor-representation carried on said film is also disposed as diagrammatically indicated in dotted lines at 53. Let us assume that the extent of reciprocation of tube 51 upon tube 50 has been ascertained to be proper for focal accord when equivalent to that illustrated, and that the design of the parts has been such that the temporarily fixed location of the eccentric pin 42′, in the light of the location and design of the connected parts, is such that, during the period when the said pin is temporarily so fixed, the said accord-relation between the lens-element 48 and the lens-element 49 will be continuously maintained. Now upon revolution of the gear-wheel 33 in the direction of its arrow, it will set up a revolution of gear-wheel 35 in the direction of its arrow, and the latter will in turn set up a revolution of the pinion 37 in the direction of its arrow, pinion 37 carrying with it the driving wheel 22, so that the stud 21 mounted upon said driving wheel will traverse an arcuate path in the direction of the adjacent arrow until, let us assume, it has taken up the position illustrated in dotted lines at 27.

During the travel of stud 21 from the position illustrated *per se* at 21 to the position illustrated in dotted lines at 27, it is clear that star wheel 20 has been meanwhile locked quiescent upon its shaft 19, the convex periphery of the driving wheel 22 having had sliding movement relatively of the adjacent fixed concave periphery of the star wheel 20; and that consequently gear-wheel 39, in mesh with pinion 40, the latter controlling, through the eccentric and pivotal connections shown, the various relations between lens-elements 48 and 49, has remained likewise fixed, thereby maintaining the aforesaid relation between the lens-elements 48 and 49 wherein they coöperate for the previously assumed focal accord.

It will thus be seen that during the travel of stud 21 from its location 21 to approximately its location 27, the representation 52 has remained stationary in the path of the ray-pencil and thus has been fixedly projected during the time required for stud 21 to take up its relocation at 27.

Upon the further rotation of gear-wheel 33, driving wheel 22, actuated through the gear-train, will cause its stud 21 to leave the location 27 and continue its arcuate travel. Stud 21 will thereupon enter the mouth of the radial slot 24, and, by virtue of the clearance afforded by the cutaway portion 28 of the driving wheel 22, will carry star wheel 20 with it for a quarter revolution thereof, or until slot 24 assumes the disposition shown in the drawings as having initially been occupied by the slot 23; whereupon the stud 21 will be free to make exit from the mouth thereof and thereupon enter upon a repetition or repetitions of its circumferentially defined operations.

Stud 21 having, as aforesaid, entered the position illustrated in dotted lines at 27, it will be clear that in the further travel of said stud 21 from the position illustrated at 27 back to the initially assumed location thereof, star wheel 20 will have been given a quarter revolution, carrying with it sprocket wheel 15, thereby causing the descent into obscurity of the representation 52 and causing the entry of representation 53 into the former location of representation 52 opposite the window 14. Simultaneously, the quarter revolution of gear-wheel 39 has caused a complete revolution of pinion 40, this last movement, through the means indicated, causing the lens-element 48, first, to leave its shown state of focal accord, next, to take up the predetermined stage of focal discord, and, lastly, to reassume its normal state of focal accord. And at this point the principle of optics which has been utilized in this type of embodiment of the invention will be specifically referred to. It is well known that upon properly setting up a focal discord, the utilized lens-means will distort, commingle, and cause mutual overlap between the infinite plurality of light-rays joining the representation and its image in such a way that the mass of light will be sufficiently diffused and blended as to bring about the formation between the lights and shadows of what may be called an optical mixture, for presenting upon the screen a generally uniform area of illumination having a light grayish or almost purely intensely white characteristic. It will accordingly be apparent that upon the aforesaid quarter revolution of the sprocket wheel 15, the representation 52 will, as aforesaid, be shifted out of the light area, but preferably not before the preferably slightly advanced actuation of the pinion 40, the very commencement of the actuation of which will serve to change to the focal discord aforesaid the previously existing focal accord between lens-elements 48 and 49. It will also accordingly be apparent that during the existence of this focal discord, representation 52 will completely be removed from the light area and that representation 53 will be completely substituted within such area; whereupon, in accordance with a preferable design of the eccentrically connected parts, lens-element 48 will be returned to focal accord with lens-element 49, but preferably subsequent to the absolute fixation within the light area of the representation 53. It is obvious that these actuations will take place usually at a relatively great speed of sequence; and that during the substitution of representation 53 for its preceding representation 52, a general area of grayness and yet nevertheless of substantially unimpaired illuminative fixity will be presented upon the screen. This illuminative fixity, moreover, will present the appearance of immobility, being of a substantially uniform shade of grayness. It will follow, finally, that the phenomenon of the persistency of vision, the maintenance of illumination and the concomitant disguisement of the substitution of one representation for its predecessor, will combine to set up an absolute illusion of movement in a new and novel manner and with a perfection of effect that has never heretofore been attainable.

Attention is now directed to Figs. 3 and 4, wherein another, out of many alternative means, is shown for alternately setting up the focal accord and focal discord mentioned above as being within the contemplation of the invention. It will be seen that there is here provided a portion of the casing 6, the window 30, the lens-element 48, the tube 50, the lens-element 49 and the tube 51. The tube 51 is supported as shown by the bracket 54 for reciprocation therethrough, and tube 51 accommodates therein the tube 50 whereby the latter may have reciprocation relatively of tube 51 irrespective of the reciprocation of the latter tube with relation to the bracket 54. The object of this embodiment is to minimize, as far as possible, the range of physical displacement of an individual lens-element necessary to properly vary the requisite respective focal conditions, and the means shown are directed to the function of simultaneously displacing both lens-elements 48 and 49 whereby a cumulative accord or discord is set up. As shown most clearly in Fig. 4, tube 50 and tube 51 are provided oppositely thereof with a plurality of lateral slots which substantially overlie each other longitudinally of the tubes. Both longitudinal slots carried by tube 51 are provided as shown with a rack portion 55, and both longitudinal slots carried by tube 50 are provided as shown with a rack portion 56. These rack portions are adapted to co-act with the teeth carried by an adjacent pinion 57, each pinion 57 being mounted upon its shaft 58, and the shafts 58 being fixedly engaged as shown by the yoke 59 formed integral with the lever 60. Lever 60 is pivotally connected as at 61 with a link 62 which is eccentrically mounted upon the pinion 63 in a manner similar to the mounting in Fig. 1 of the link 42 upon the pinion 40.

The method of operation of this variation in the embodiment first disclosed should be obvious. It is clear that upon an actuation of the lever 60, the pinions 57 will rotate similarly upon the shafts 58, thereby, through the rack-meshing just described, causing the lens-elements 48 and 49 to simultaneously approach or diverge from each other in accordance with the construction of the parts.

In amplification of the focal-accord and discord principle underlying the disclosure of the present embodiments of this invention, attention is directed to Fig. 5, which diagrammatically indicates a plurality of the possible focus-factor elements. Thus there is illustrated in normal focal-accord disposition a representation 64, a lens-means 67, and an image-receiving area 68; from which it will be clear that a focal discord when desired may be selectively set up either by causing representations 64 to take either the location 65 or 66, or by causing the lens-means 67 to take up either the location 68 or 69, or by causing the screen 70 to take up either the location 71 or 72.

Whenever I have used the word "screen" I have intended to include any surface whatsoever utilizable for receiving an image from an optical device.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

Having described my invention, what I claim as new and desire to secure by Letters Patent, is:

1. In a motion picture projecting apparatus, lighting means, a movable objective lens through which the light rays from the lighting means pass, means for advancing a succession of pictures intermittently into the path of the light rays, and means for intermittently moving the objective lens horizontally simultaneously with the advance of the film, thereby destroying the focus.

2. In a motion picture projecting apparatus, a lighting means, an objective lens through which the light rays from the lighting means pass, a support for a picture to be projected, a screen, means for moving one of said elements relative to the other thereby periodically destroying the focus and means for advancing a series of pictures to the support in correspondence with the movement of the movable element.

3. In a motion picture apparatus, a lens system, including a movable objective lens, and means for moving said movable lens intermittently simultaneously with the changing of the picture, whereby the focus through the lens system is intermittently destroyed at the moment of the changing of the picture.

4. In a motion picture apparatus, including a lens system and means for intermittently advancing a film, means for destroying the focus in the lens system simultaneously with the advance of the film while maintaining a constant amount of light upon the screen.

5. In a motion picture projecting apparatus, a lighting means, an objective lens through which the light rays from the lighting means pass, a support for a picture to be projected, a screen, means for moving one of said elements horizontally relative to the other thereby periodically destroying the focus and means for advancing a series of pictures to the support in correspondence with the horizontal movement of the movable element.

In testimony whereof, I have hereunto signed my name in the presence of two witnesses.

AUG. P. JURGENSEN.

Witnesses:
A. M. HENRY,
SOLON J. LEILESKIND.